US010045189B2

(12) United States Patent
Zermeno et al.

(10) Patent No.: US 10,045,189 B2
(45) Date of Patent: *Aug. 7, 2018

(54) ENHANCED WIRELESS HOME PHONE FOR AN EMERGENCY CALL SERVICE NETWORK

(71) Applicants: AT&T Intellectual Property I, L.P., Atlanta, GA (US); AT&T Mobility II LLC, Atlanta, GA (US)

(72) Inventors: Juan Zermeno, Folsom, CA (US); Lizbet Gonzalez, Boca Raton, FL (US); Liaqat Ali, Danville, CA (US); Debbie Knittel, Mesa, AZ (US); John Mark Dammrose, Snohomish, WA (US); William S Morris, IV, Bellevue, WA (US); Richard Warburton Davis, Seattle, WA (US)

(73) Assignees: AT&T INTELLECTUAL PROPERTY I, L.P., Atlanta, GA (US); AT&T MOBILITY II LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/480,346

(22) Filed: Apr. 5, 2017

(65) Prior Publication Data
US 2017/0215058 A1 Jul. 27, 2017

Related U.S. Application Data

(63) Continuation of application No. 14/311,053, filed on Jun. 20, 2014, now Pat. No. 9,622,061.

(51) Int. Cl.
H04M 11/04 (2006.01)
G06Q 30/00 (2012.01)
(Continued)

(52) U.S. Cl.
CPC ............. *H04W 4/90* (2018.02); *H04M 11/04* (2013.01); *H04W 4/026* (2013.01); *H04W 4/22* (2013.01)

(58) Field of Classification Search
CPC ........ H04W 4/026; H04W 4/22; H04W 11/04
(Continued)

(56) References Cited

U.S. PATENT DOCUMENTS 6,138,026 A 10/2000 Irvin
6,185,427 B1 2/2001 Krasner et al.
(Continued)

OTHER PUBLICATIONS

Reed, Jeffrey H., et al., "An overview of the challenges and progress in meeting the E-911 requirement for location service," IEEE Communications Magazine 36.4 (Apr. 1998): pp. 30-37.
(Continued)

*Primary Examiner* — Rafael Pérez-Gutiérrez
*Assistant Examiner* — Mark G. Pannell
(74) *Attorney, Agent, or Firm* — Amin, Turocy & Watson, LLP

(57) ABSTRACT

An enhanced wireless home phone (WHP) component for use in an emergency call service network is presented herein. A method can include in response to determining that address information representing an address corresponding to a subscriber identity associated with a wireless service has been included in a data store corresponding to an emergency telecommunication service, determining whether a location of a wireless communication device associated with the subscriber identity satisfies a defined condition with respect to a distance of the wireless communication device from the address; and in response to determining that the location of the wireless communication device satisfies the defined condition, and in response to determining that a communication corresponding to the emergency telecommunication service has been received from the wireless communication
(Continued)

device, sending the address information directed to a public safety answering point device.

20 Claims, 13 Drawing Sheets

(51) Int. Cl.
  *H04W 4/90* (2018.01)
  *H04W 4/22* (2009.01)
  *H04W 4/02* (2018.01)
(58) Field of Classification Search
  USPC .................................................. 455/402.2
  See application file for complete search history.

(56) References Cited

U.S. PATENT DOCUMENTS

| | | | |
|---|---|---|---|
| 6,760,762 B2 | 7/2004 | Pezzutti | |
| 7,054,642 B1* | 5/2006 | Matz | H04M 3/38 455/405 |
| 7,099,677 B2 | 8/2006 | Contractor | |
| 7,177,623 B2 | 2/2007 | Baldwin | |
| 7,379,729 B2 | 5/2008 | Holland et al. | |
| 7,496,652 B2 | 2/2009 | Pezzutti | |
| 7,742,578 B1 | 6/2010 | Klesper et al. | |
| 7,920,876 B2 | 4/2011 | Rahman | |
| 7,953,209 B2 | 5/2011 | Crago et al. | |
| 7,974,388 B2 | 7/2011 | Sadot | |
| 8,102,281 B2 | 1/2012 | Ohki | |
| 8,175,614 B1 | 5/2012 | Green et al. | |
| 8,280,341 B2 | 10/2012 | Edelmann et al. | |
| 8,289,958 B1 | 10/2012 | Narayanan | |
| 8,364,117 B2 | 1/2013 | Hawkins | |
| 8,380,158 B2 | 2/2013 | McCulloch | |
| 8,504,729 B2 | 8/2013 | Pezzutti | |
| 2005/0200492 A1 | 9/2005 | Woodard et al. | |
| 2005/0267803 A1* | 12/2005 | Patel | G06Q 30/02 705/14.53 |
| 2007/0008127 A1* | 1/2007 | Jakobsen | G08B 25/016 340/568.1 |
| 2007/0296575 A1* | 12/2007 | Eisold | G08B 27/006 340/539.16 |
| 2008/0197999 A1* | 8/2008 | Henderson | G08B 17/125 340/521 |
| 2008/0260110 A1* | 10/2008 | Chotai | H04M 3/42357 379/45 |
| 2010/0003946 A1 | 1/2010 | Ray et al. | |
| 2010/0020942 A1 | 1/2010 | Olshansky et al. | |
| 2010/0035588 A1 | 2/2010 | Adler et al. | |
| 2010/0046406 A1 | 2/2010 | Annamalai et al. | |
| 2011/0051658 A1 | 3/2011 | Jin et al. | |
| 2011/0201299 A1 | 8/2011 | Kamdar | |
| 2011/0287737 A1 | 11/2011 | Jones | |
| 2012/0113804 A1 | 5/2012 | Zhang | |
| 2012/0236760 A1 | 9/2012 | Ionescu et al. | |
| 2012/0295636 A1 | 11/2012 | Drucker | |
| 2012/0314699 A1 | 12/2012 | Qiu et al. | |
| 2013/0029634 A1 | 1/2013 | Li | |
| 2013/0059560 A1 | 3/2013 | Ray et al. | |
| 2014/0036658 A1 | 2/2014 | Bonner et al. | |
| 2014/0059046 A1 | 2/2014 | Bansal et al. | |
| 2014/0071981 A1 | 3/2014 | Olshansky et al. | |
| 2015/0031397 A1 | 1/2015 | Jouaux et al. | |
| 2015/0097670 A1* | 4/2015 | Chitre | G08B 25/016 340/539.13 |
| 2015/0120412 A1* | 4/2015 | Deshpande | G06Q 30/0211 705/14.13 |
| 2015/0312738 A1 | 10/2015 | Deich et al. | |

OTHER PUBLICATIONS

Handler, Darren, "An Island of Chaos Surrounded by a Sea of Confusion: The E911 Wireless Device Location Initiative," VA. JL & Tech. 10 (Jan. 2005): pp. 1-11.

Sayed, Ali H., Alireza Tarighat, and Nima Khajehnouri. "Network-based wireless location: challenges faced in developing techniques for accurate wireless location information," Signal Processing Magazine, IEEE 22.4 (Jul. 2005): pp. 24-40.

Junglas, Iris A., and Richard T. Watson, "Location-based services," Communications of the ACM 51.3 (Mar. 2008): pp. 65-69.

Horan, Thomas A., and Benjamin L. Schooley, "Time-critical information services," Communications of the ACM 50.3 (Mar. 2007): pp. 73-78.

Office Action for U.S. Appl. No. 14/311,053 dated Feb. 16, 2016, 48 pages.

Office Action for U.S. Appl. No. 14/311,053 dated Jun. 8, 2016, 39 pages.

Office Action for U.S. Appl. No. 14/311,053 dated Sep. 16, 2015, 47 pages.

* cited by examiner

ENHANCED WIRELESS HOME PHONE FOR AN EMERGENCY CALL SERVICE NETWORK

CROSS REFERENCE TO RELATED APPLICATION

This patent application is a continuation of, and claims priority to, U.S. patent application Ser. No. 14/311,053, filed on Jun. 20, 2014 (now U.S. Pat. No. 9,622,061, issued Apr. 11, 2017), and entitled "ENHANCED WIRELESS HOME PHONE FOR AN EMERGENCY CALL SERVICE NETWORK," the entirety of which application is hereby incorporated by reference herein.

TECHNICAL FIELD

The subject disclosure generally relates to embodiments for an enhanced wireless home phone and wireless business phone for use in an emergency call service network.

BACKGROUND

Enhanced 911 (E911) services estimate a location of a 911 caller to assist with dispatching emergency personnel. However, conventional emergency call service technologies have had some drawbacks, some of which may be noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
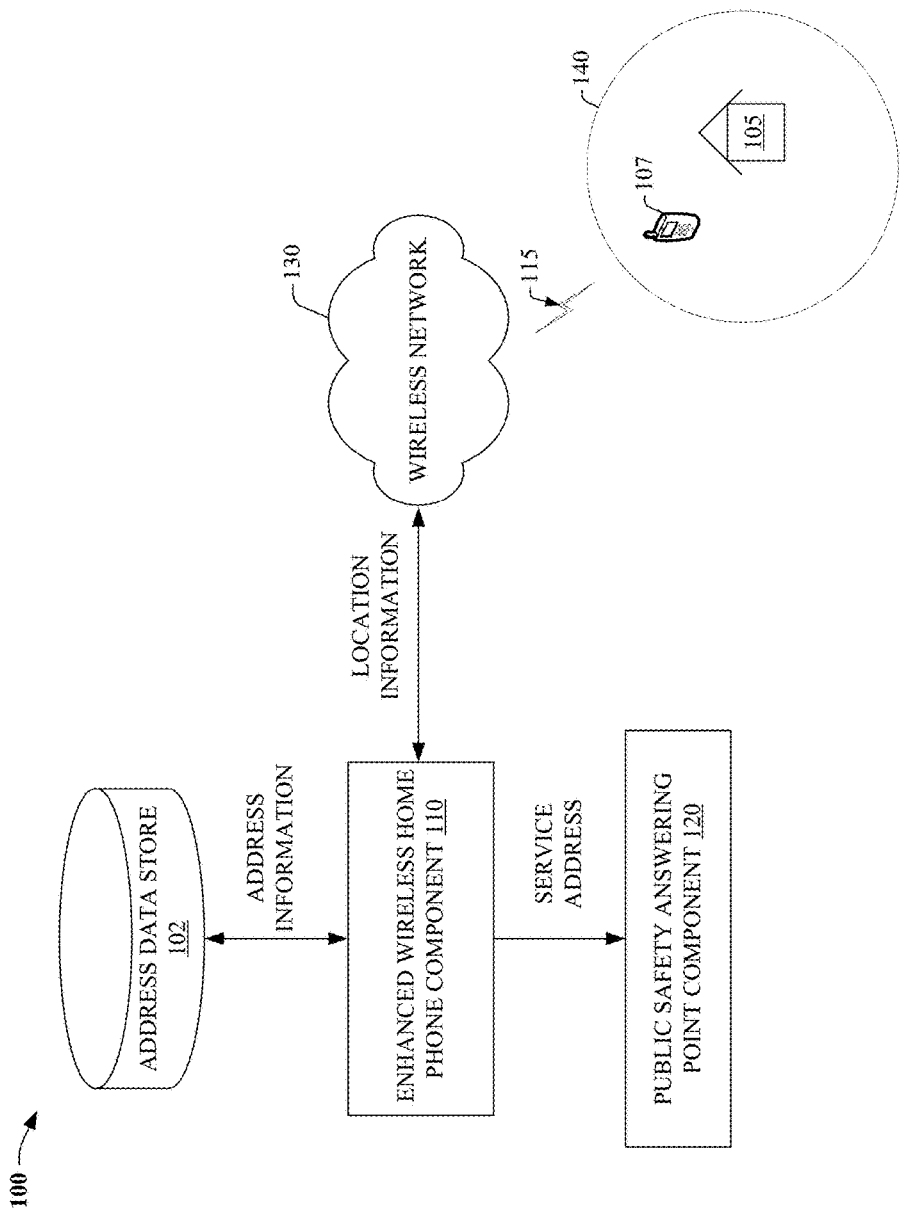
FIG. 1 illustrates a block diagram of an emergency telecommunication service network environment, in accordance with various embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

A wireless home phone (WHP) device is associated with a cellular based service. The WHP device can be used with home phone equipment in a residence or office, and may be taken on vacation, e.g., in a recreational vehicle (RV), a hotel room, etc. While international call roaming is not enabled for WHP devices, conventional WHP technologies support routing of emergency calls, e.g., 911 calls, etc. using wireless Enhanced 911, E-911, or E911 processes that link emergency callers with appropriate public resources.

Under wireless, Mobility, etc. E911 Phase I and Phase II milestones issued by the U.S. Federal Communications Commission (FCC), wireless network operators must identify the phone number and cell phone tower used by emergency callers (Phase I), and wireless network operators must provide the latitude and longitude of callers within 300 meters (Phase II). Such location information is not only transmitted to a call center, e.g., Public Safety Answering Point (PSAP), for the purpose of sending emergency services to the scene of an incident, but is also used by wireless network operators to determine which PSAP to route 9-1-1 calls.

Various embodiments disclosed herein can enhance WHP emergency, e.g., E911, etc. services by providing "wireline" E911 functionality to WHP E911 calls. In this regard, such embodiments can provide, during an E911 call from a WHP device, an address, registered service address, address of a principle place of use of the WHP device, etc. for a subscriber of a WHP service to a PSAP for facilitating a faster, more direct emergency response of first call responders to a location where an emergency service has been requested.

For example, a method can determine, by a system comprising a processor, e.g., by an enhanced WHP component of a wireless network, emergency call service network, etc. whether address information representing the address, registered service address, principle place of use of a wireless communication device corresponding to a subscriber, subscriber identity, etc. associated with a wireless service, e.g., a WHP service, has been included in a data store, e.g., a Master Street Address Guide (MSAG) describing the exact spelling of streets/street number ranges/other address elements, etc. associated with an emergency telecommunication service, e.g., E911 service, text-to-911 services supported by respective PSAPs, etc. In an embodiment, the method can determine whether the address information has been included in the data store at a first validation point associated with a point of sale (POS) of the wireless communication device. Further, the method can determine whether the address information has been included in the data store at a second validation point associated with activation of the wireless service, e.g., at a residence of the subscriber, e.g., corresponding to the address, registered service address, principle place of use, etc. of the wireless communication device.

In one embodiment, the method can determine, by the enhanced WHP component, whether the address information has been included in the data store by sending an address request directed to a service provider system, device, etc., e.g., corresponding to a Selective Routing Database (SRDB), an MSAG, an Automatic Location Information (ALI) data store, e.g., maintained by an Incumbent Local Exchange Carrier (ILEC), etc. In this regard, in one or more embodiments, the service provider system can be configured to enable access to the SRDB, MSAG, ALI data store, etc. Further, the method can receive, by the enhanced WHP component based on the address request, the address information representing the address, other information representing whether the address information has been included in the data store, etc. from the service provider system, device, etc.

In another embodiment, in response to determining that the address information has not been included in the data store, e.g., after the first validation point, after the second validation point, after multiple validation points, etc., and in response to determining that a communication, e.g., 9-1-1 call, corresponding to the emergency telecommunication service, e.g., E911, has been received from the wireless communication device, the method can send, by the enhanced WHP component, location information, e.g., the Mobility E911 Phase I and/or Phase II location information representing the location of the wireless communication device, e.g., Mobility E911 Phase I location information representing a location of a base station receiving the E911 call from the wireless communication device, Mobility E911 Phase II location information representing a latitude and longitude of the wireless communication device, etc. directed to a PSAP. In yet another embodiment, the method can also send a name of the subscriber and/or a call back number of the subscriber directed to the PSAP.

In one embodiment, in response to determining that the address information has been included in the data store, the method can determine, by the enhanced WHP component, whether a location, geolocation, latitude and longitude, etc. of the wireless communication device satisfies a first defined condition with respect to a distance, radial distance, etc. of the wireless communication device from the address, geolocation of the address, latitude and longitude of the address, etc., e.g., the wireless communication device being no more than 150 meters from the address, etc. Furthermore, in response to determining that the location of the wireless communication device satisfies the first defined condition with respect to the distance of the wireless communication device from the address, and in response to determining that the communication corresponding to the emergency telecommunication service has been received from the wireless communication device, the method can send, by the enhanced WHP component, the address information directed to the PSAP, e.g., in response to the E911 call being made via the wireless communication device—facilitating expeditious location of an 9-1-1 caller by first call responder(s), e.g., police, firefighters, etc.

In an embodiment, the method can determine, by the enhanced WHP component, whether the location of the wireless communication device satisfies the first defined condition with respect to the distance of the wireless communication device from the address by sending a location request directed to a service provider device, location system, etc. that can track the location of the wireless communication device using, e.g., Assisted GPS (A-GPS), Observed Time Difference of Arrival (OTDOA), Uplink-Time Difference of Arrival (U-TDOA), a Global Positioning System (GPS), a Global Navigation Satellite System (GLONASS), angle of arrival (AOA), time difference of arrival (TDOA), Enhanced Observed Time Difference (E-OTD), etc.

In one embodiment, the service provider device, location system, etc. can track the location of the wireless communication device utilizing a radio resource location services (LCS) protocol (RRLP) that can be used to exchange messages between the wireless communication device and a Serving Mobile Location Center (SMLC) to obtain geolocation, e.g., latitude and longitude, information corresponding to the wireless communication device. In this regard, the method can receive, by the enhanced WHP component based on the location request, e.g., from the service provider device, location system, etc. location information, geolocation information, e.g., GPS based coordinates, e.g., a latitude and longitude of the wireless device, etc. representing the location of the wireless communication device.

In another embodiment, the method can periodically reconfirm, determine, etc., by the enhanced WHP component, based on a defined frequency, e.g., daily, weekly, monthly, etc. whether the location of the wireless communication device satisfies the first defined condition with respect to the distance of the wireless communication device from the address. For example, the method can reconfirm, every 24 hours, whether the wireless communication device is no more than 150 meters from the address.

In an embodiment, in response to determining that the location of the wireless communication device does not satisfy the first defined condition with respect to the distance of the wireless communication device from the address, e.g., in response to determining that the wireless communication device is more than 150 meters from the address, etc., and in response to determining that the communication, e.g., 9-1-1 call, corresponding to the emergency telecommunication service, e.g., E911, has been received from the wireless communication device, the method can send, by the enhanced WHP component, the location information, e.g., Mobility E911 Phase I location information, Mobility E911 Phase II location information, etc. directed to the PSAP. Further, the method can send the name of the subscriber and/or the call back number of the subscriber directed to the PSAP during the emergency telecommunication service.

In one embodiment, in response to determining that the location of the wireless communication device does not satisfy the first defined condition with respect to the distance of the wireless communication device from the address, the method can determine, by the enhanced WHP component, whether the location of the wireless communication device satisfies a second defined condition with respect to the distance of the wireless communication device from the address, e.g., whether the wireless communication device is more than 150 meters from the address, but less than or equal to 2 kilometers from the address.

In another embodiment, in response to determining that the location of the wireless communication device satisfies the second defined condition, e.g., the wireless communication device is more than 150 meters from the address, but less than or equal to 2 kilometers from the address, the method can determine, by the enhanced WHP component based on a defined schedule, e.g., performing a first number of location queries per day, e.g., 3—morning, noon, evening, etc. for a second number of consecutive days, e.g., 3, etc. whether the location of the wireless communication device satisfies the first defined condition, e.g., the wireless communication device is no more than 150 meters from the address. In this regard, the method can account for location measurement errors, e.g., due to mountainous terrain, tall buildings, adverse weather conditions, etc.

In yet another embodiment, in response to determining, during the defined schedule, that the location of the wireless communication device does not satisfy the first defined condition, e.g., that the wireless communication device is more than 150 meters from the address, the method can send, by a notification component, e.g., via a "customer notification" and/or "call to action" process, a message, notification, phone message, email message, text message, letter mailed to a billing address of the subscriber, etc. directed to the subscriber at a defined frequency, e.g., once per week, for a defined period of time, e.g., 4 consecutive weeks, etc. In one or more embodiments, the message can include a recorded message sent to a phone number of the wireless communication device, a text message sent to a cell number specified by the subscriber, e.g., at the POS of the wireless communication device, an email sent to an email account specified by the subscriber, e.g., at the POS of the wireless communication device, a notice sent to an account of the subscriber corresponding to a cloud-based website of a wireless service provider corresponding to the wireless service, etc.

In an embodiment, in response to determining, after the defined period of time, e.g., after 4 weeks, after a defined consecutive number of notifications, etc. that the address has not been updated, stored, etc, in the data store, or that the location of the wireless communication device does not satisfy the first defined condition, the method can send, by the notification component, a message, e.g., final notice, etc. to the subscriber, e.g., stating an inability to support service address submittal during E911 services, but an ability to provide E911 latitude and longitude location information, subscriber name, and customer call back information during E911 services.

Another embodiment can include a system comprising: a memory to store executable instructions; and a processor, coupled to the memory, that facilitates execution of the executable instructions to perform operations, comprising: in response to determining that information representing an address, registered service address, principal place of use, etc. corresponding to a subscriber of a wireless service, a subscriber identity representative of the subscriber that has subscribed to the wireless service, etc. has been included in a data store, e.g., MSAG, associated with an emergency telecommunication service, e.g., E911, determining whether a distance from a wireless communication device, e.g., WHP device, corresponding to the subscriber to a geolocation, e.g., latitude and longitude, corresponding to the address satisfies a first defined condition, e.g., the distance being less than or equal to 150 meters; and in response to determining that the distance from the wireless communication device to the geolocation corresponding to the address satisfies the first defined condition, and in response to determining that a communication, e.g., 9-1-1 call, corresponding to the emergency telecommunication service has been received from the wireless communication device, sending the information representing the address directed to a PSAP device.

In an embodiment, the operations can include: periodically determining, based on a defined period, e.g., daily, whether the distance from the wireless communication device to the geolocation corresponding to the address satisfies the first defined condition.

In another embodiment, the operations can include: in response to determining that the information representing the address has not been included in the data store associated with the emergency telecommunication service, and in response to determining that the communication corresponding to the emergency telecommunication service has been received from the wireless communication device, sending location information representing a location of the wireless communication device, e.g., Mobility E911 Phase I information, Mobility E911 Phase II information, etc. directed to the PSAP device.

In yet other embodiments, the operations can include: in response to determining that the distance from the wireless communication device to the geolocation corresponding to the address does not satisfy the first defined condition, and in response to determining that the communication corresponding to the emergency telecommunication service has been received from the wireless communication device, sending the location information representing the location of the wireless communication device directed to the PSAP device.

In an embodiment, operations can include: in response to determining that the distance from the wireless communication device to the geolocation corresponding to the address does not satisfy the first defined condition, determining whether the distance from the wireless communication device to the geolocation corresponding to the address satisfies a second defined condition, e.g., whether the wireless communication device is more than 150 meters from the address, but less than or equal to 2 kilometers from the address, etc.

In one embodiment, the operations can include: in response to determining that the distance from the wireless communication device to the geolocation corresponding to the address satisfies the second defined condition, and in response to determining, based on a defined schedule, e.g., M×queries per N×days, e.g., 3 queries over 3 days, etc. that the distance from the wireless communication device to the geolocation corresponding to the address does not satisfy the first defined condition, sending a message, notification, phone message, text message, etc. directed to the subscriber of the wireless service, e.g., X days per week over Y weeks.

Another embodiment can include a computer-readable storage device comprising executable instructions that, in response to execution, cause a system comprising a processor to perform operations, comprising: in response to determining that an address corresponding to a subscriber of a wireless service, a subscriber identity associated with the wireless service, etc. has been included in a data store corresponding to an emergency telecommunication service, determining whether a location of a wireless communication device associated with the subscriber satisfies a defined condition with respect to a distance from a first geolocation of the wireless communication device to a second geolocation of the address; and in response to determining that the location of the wireless communication device satisfies the defined condition, and in resonse to determing that a communication corresponding to the emergency telecommunication service has been received from the wireless communication device, sending information representing the address directed to a PSAP device.

In yet another embodiment, the operations can include: in response to determining that the address corresponding to the subscriber has not been included in the data store, and in response to determining that the communication corresponding to the emergency telecommunication service has been received from the wireless communication device, sending location information representing the location of the wireless communication device directed to the PSAP device.

In one embodiment, the operations can include: in response to determining that the location of the wireless communication device does not satisfy the defined condition, and in response to determining that the communication corresponding to the emergency telecommunication service has been received from the wireless communication device, sending location information representing the location of the wireless communication device directed to the PSAP device.

In an embodiment, the location information can include GPS information representing a latitude of the wireless communication device and a longitude of the wireless communication device.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s); optical disk (e.g., compact disk (CD), digital video disc (DVD), Blu-ray Disc (BD)); smart card(s); and flash memory device(s) (e.g., card, stick, key drive); and/or a virtual device that emulates a storage device and/or any of the above computer-readable media.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used, via address component 212 (see below), to determine whether information representing an address corresponding to a subscriber of a wireless service has been included in a data store associated with an emergency telecommunication service. Further, the artificial intelligence system can be used via location component 214 (see below), to determine whether a distance from a wireless communication device to a geolocation corresponding to the address satisfies a defined condition.

A classifier can be a function that maps an input attribute vector, $x=(x1, x2, x3, x4, xn)$, to a confidence that the input belongs to a class, that is, $f(x)=confidence (class)$. Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

In accordance with various aspects of the subject specification, artificial intelligence based systems, components, etc. can employ classifiers that are explicitly trained, e.g., via a generic training data, etc. as well as implicitly trained, e.g., via observing characteristics of communication equipment, e.g., a gateway, wireless communication device, etc., receiving reports from such communication equipment, receiving operator preferences, receiving historical information, receiving extrinsic information, etc. For example, support vector machines can be configured via a learning or training phase within a classifier constructor and feature selection module. Thus, the classifier(s) can be used by an artificial intelligence system to automatically learn and perform a number of functions, e.g., performed by enhanced WHP component 110 (see below).

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

Aspects, features, and/or advantages of the disclosed subject matter can be exploited in substantially any wireless telecommunication or radio technology, e.g., Institute of Electrical and Electronics Engineers (IEEE) 802.XX technology, e.g., Wi-Fi, Bluetooth, etc; worldwide interoperability for microwave access (WiMAX); enhanced general packet radio service (enhanced GPRS); third generation partnership project (3GPP) long term evolution (LTE); third generation partnership project 2 (3GPP2); ultra mobile broadband (UMB); 3GPP universal mobile telecommunication system (UMTS); high speed packet access (HSPA); high speed downlink packet access (HSDPA); high speed uplink packet access (HSUPA); LTE advanced (LTE-A), global system for mobile communication (GSM), near field communication (NFC), Wibree, Wi-Fi Direct, etc.

Further, selections of a radio technology, or radio access technology, can include second generation (2G), third generation (3G), fourth generation (4G), etc. evolution of the radio access technology; however, such selections are not intended as a limitation of the disclosed subject matter and related aspects thereof. Further, aspects, features, and/or advantages of the disclosed subject matter can be exploited in disparate electromagnetic frequency bands. Moreover, one or more embodiments described herein can be executed in one or more network elements, such as a mobile wireless communication device, e.g., user equipment (UE), WHP device, etc. and/or within one or more elements of a network infrastructure, e.g., radio network controller, wireless access point (AP), etc.

Moreover, terms like "user equipment" (UE), "mobile station", "mobile subscriber station", "access terminal", "terminal", "handset", "appliance", "machine", "wireless communication device", "cellular phone", "personal digital assistant", "smartphone", "wireless device", "WHP device", and similar terminology refer to a wireless communication device, or wireless device, which is at least one of (1) utilized by a subscriber, customer, etc. of a wireless service, or communication service, to receive and/or convey data associated with storage of objects within a voice, video, sound, and/or substantially any data-stream or signaling-stream; or (2) utilized by a subscriber of a voice over internet protocol (VoIP) service that delivers voice communications over internet protocol (IP) networks such as the Internet or other packet-switched networks. Further, the foregoing terms are utilized interchangeably in the subject specification and related drawings.

Likewise, the terms "local wireless communications cite," "access point" (AP), "base station," "Node B," "eNodeB," "home Node B" (HNB), "home access point" (HAP), and the like are utilized interchangeably in the subject specification and drawings and refer to a wireless network component or apparatus that sends and/or receives data associated with voice, video, sound, and/or substantially any data-stream or signaling-stream between a set of subscriber stations and/or to/from a wireless communication device—unless context warrants particular distinction(s) among the terms. Further, the data and signaling streams can be packetized or frame-based flows.

A communication network, e.g., emergency telecommunication service network environment 100 (see below), for systems, methods, and/or apparatus disclosed herein can include any suitable mobile and/or wireline-based circuit-switched communication network including a global systems for mobile communication (GSM) network, a time division multiple access (TDMA) network, a code division multiple access (CDMA) network, such as IS-95 and subsequent iterations of CDMA technology, an integrated digital enhanced network (iDEN) network and a public switched telephone network (PSTN). Further, examples of the communication network can include any suitable data packet-switched or combination data packet/circuit-switched communication network, wired or wireless IP network such as a VoLTE network, a VoIP network, an IP data network, a universal mobile telecommunication system (UMTS) network, a general packet radio service (GPRS) network, or other communication networks that provide streaming data communication over IP and/or integrated voice and data communication over combination data packet/circuit-switched technologies.

Similarly, one of ordinary skill in the art will appreciate that a wireless system e.g., a wireless communication device, WHP 107, etc. for systems, methods, and/or apparatus disclosed herein can include a WHP based device, a mobile device, a mobile phone, a 4G, etc. cellular communication device, a PSTN phone, a cellular communication device, a cellular phone, a satellite communication device, a satellite phone, a VoIP phone, Wi-Fi phone, a dual-mode cellular/Wi-Fi phone, a combination cellular/VoIP/Wi-Fi/WiMAX/WHP phone, a portable computer, or any suitable combination thereof. Specific examples of a wireless system can include, but are not limited to, a cellular device, such as a GSM, TDMA, CDMA, IS-95 and/or iDEN phone, a cellular/Wi-Fi/WHP device, such as a dual-mode GSM, TDMA, IS-95 and/or iDEN/VoIP phones, UMTS phones, UMTS VoIP phones, or like devices or combinations thereof.

To provide support for the wireless system, the communication network can include a gateway routing component (not shown) that can include any suitable component that can perform centralized routing within a mobile, satellite, or similar network (but optionally need not include components that route strictly within a PSTN network), routing between communication networks, between networks of varying architecture (e.g., between PSTN, GSM, UMTS, WHP, Enterprise VoIP, the Internet, or combinations thereof), and the like. Specific examples of a gateway routing component can include, but are not limited to, a gateway mobile switching center (GMSC), a gateway GPRS support node (GGSN), a session border control (SBC) device, or like devices. Additionally, a data storage component of such system(s), device(s), etc. can include any suitable device, process, and/or combination device that can store digital and/or switched information (e.g., server, data store component, or the like).

Figure 2:
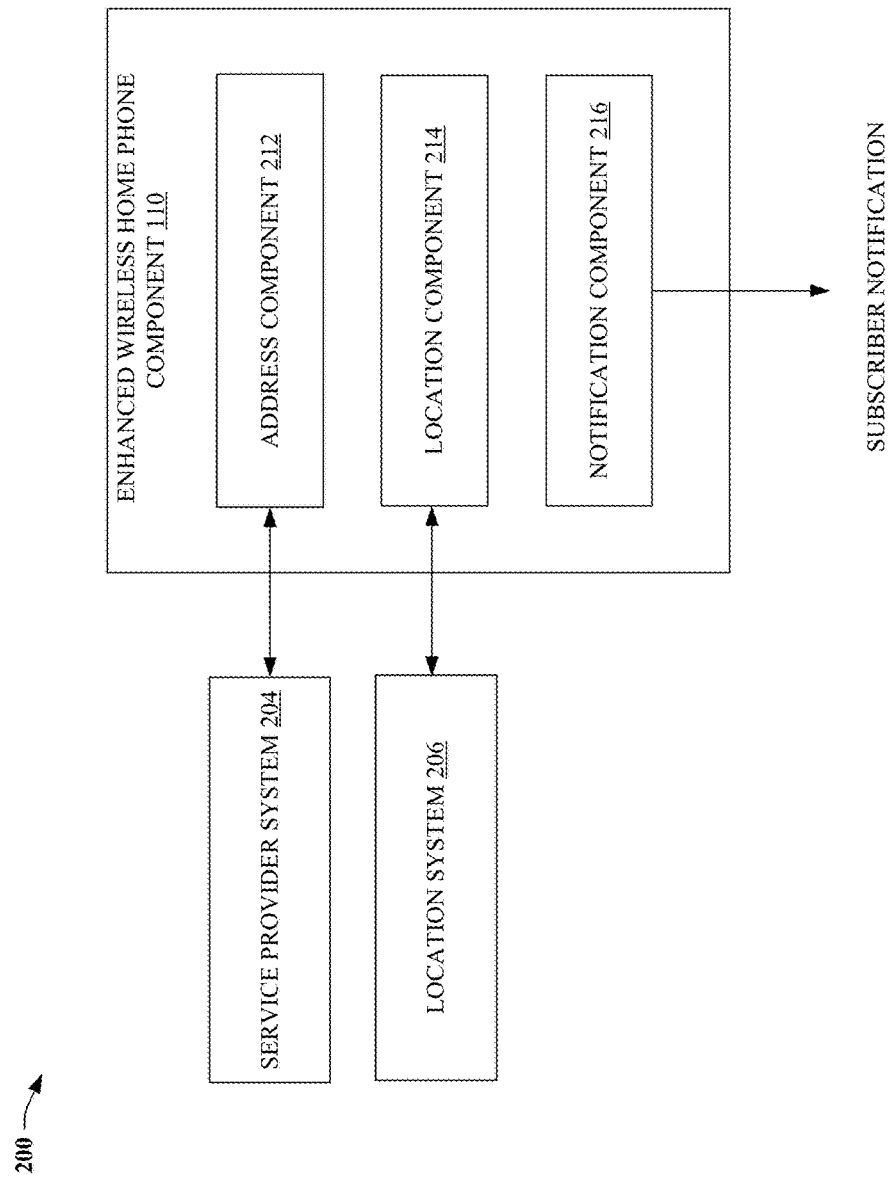
FIG. 2 illustrates a block diagram of an enhanced wireless home phone component, in accordance with various embodiments.
Figure 3:
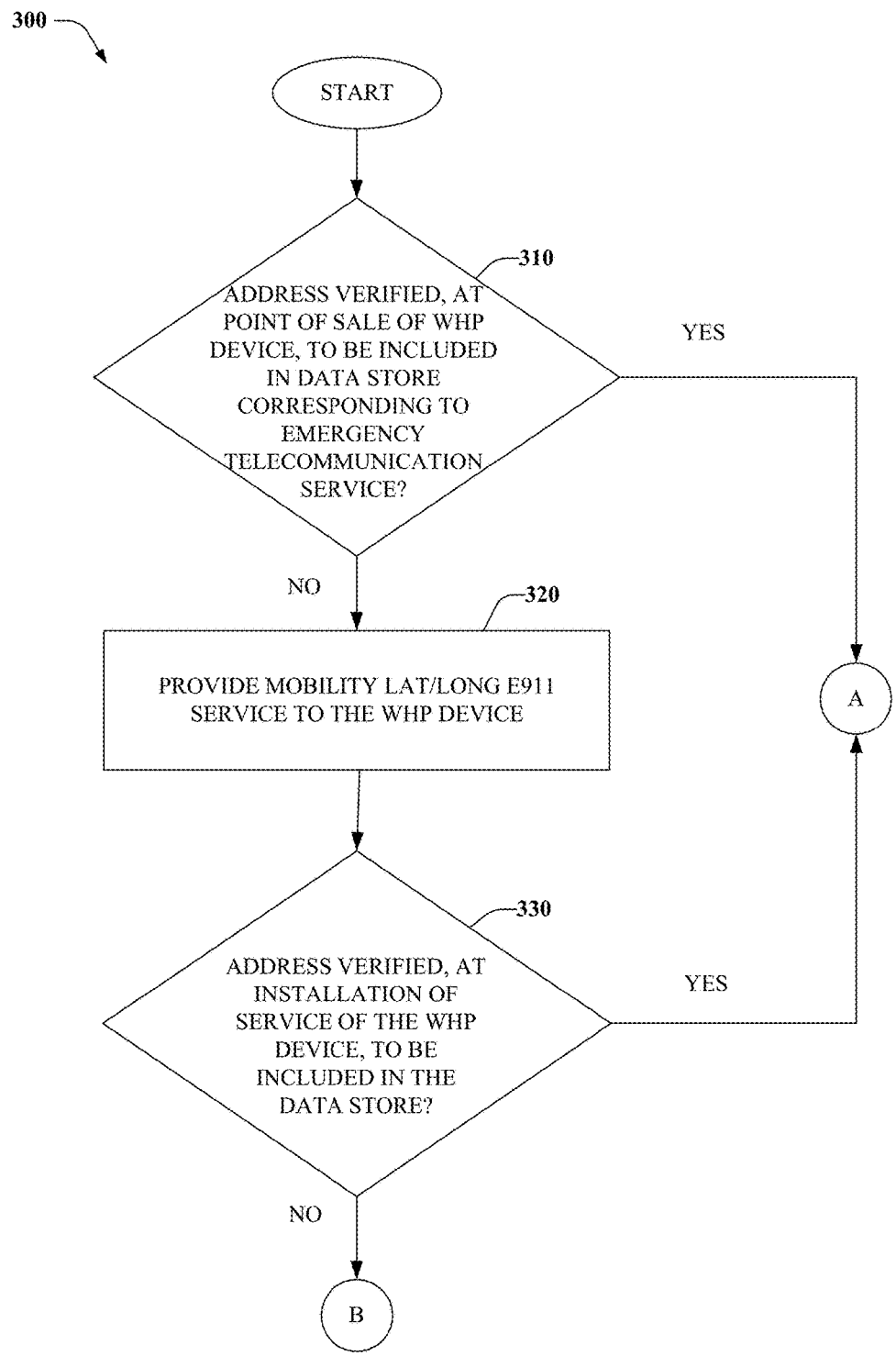
FIGS. 3-7 illustrate flow diagrams of a method associated with an enhanced wireless home phone component, in accordance with various embodiments.
Figure 4:
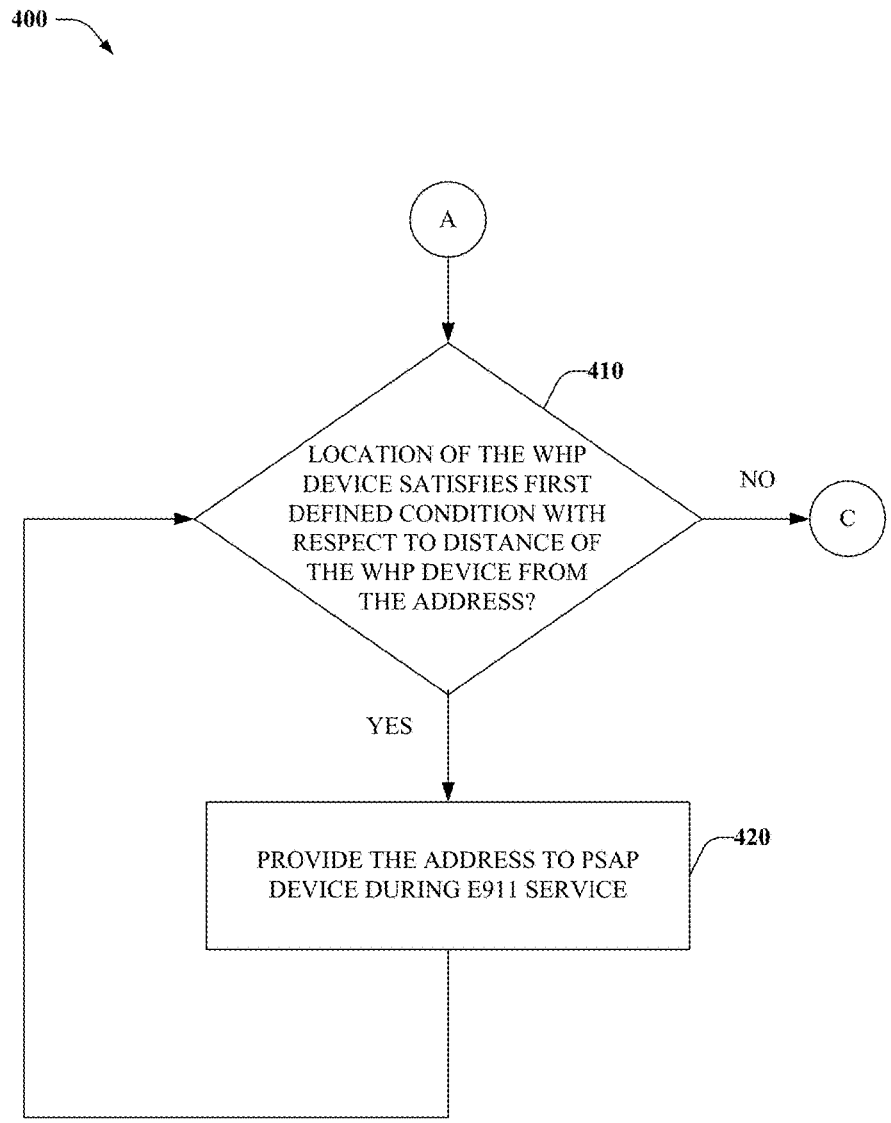
Figure 5:
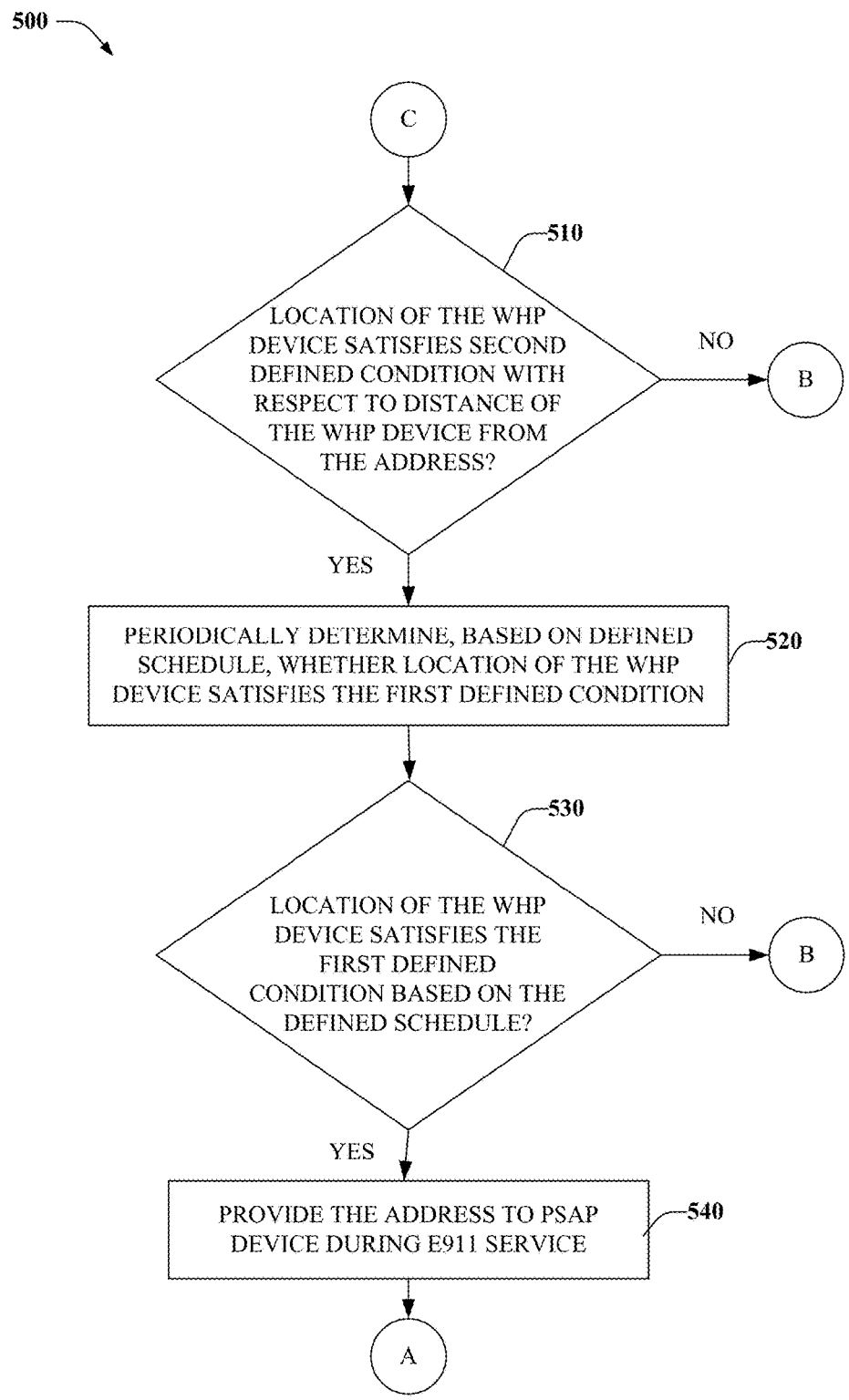
Figure 6:
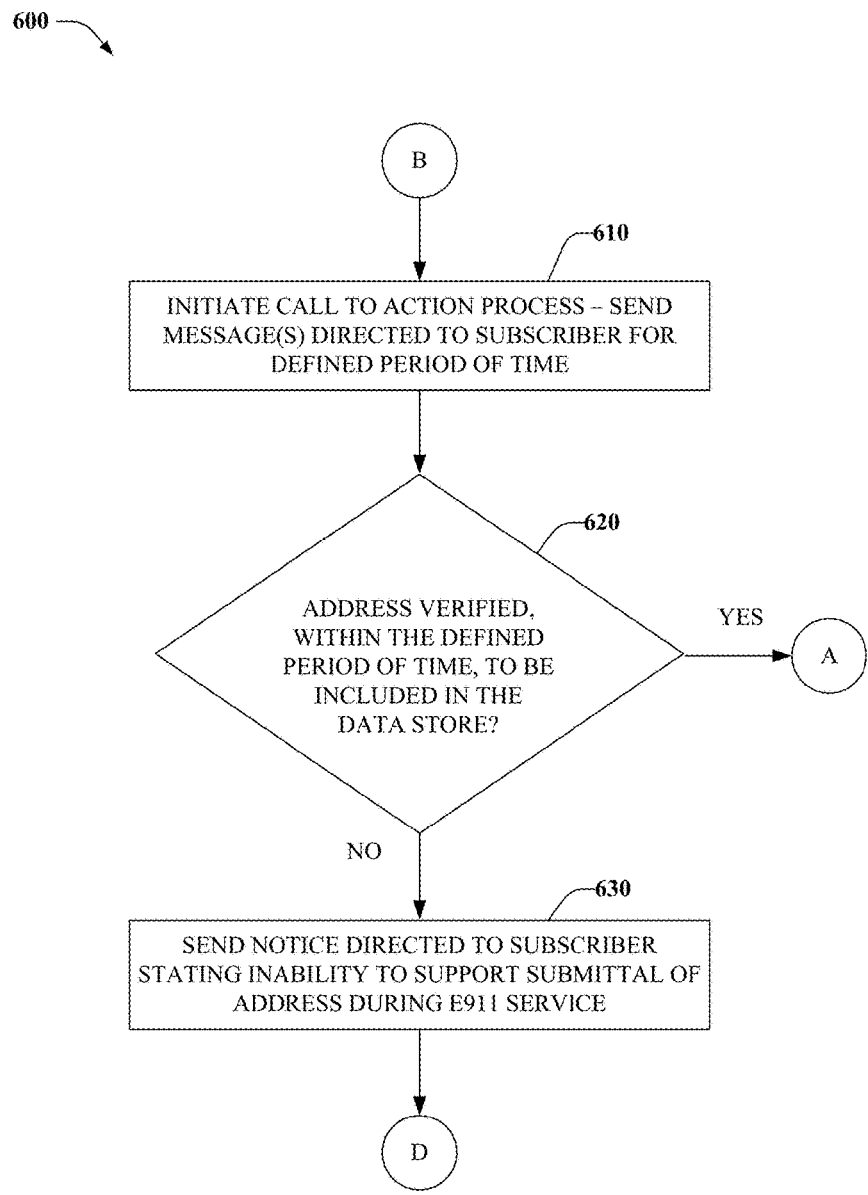
Figure 7:
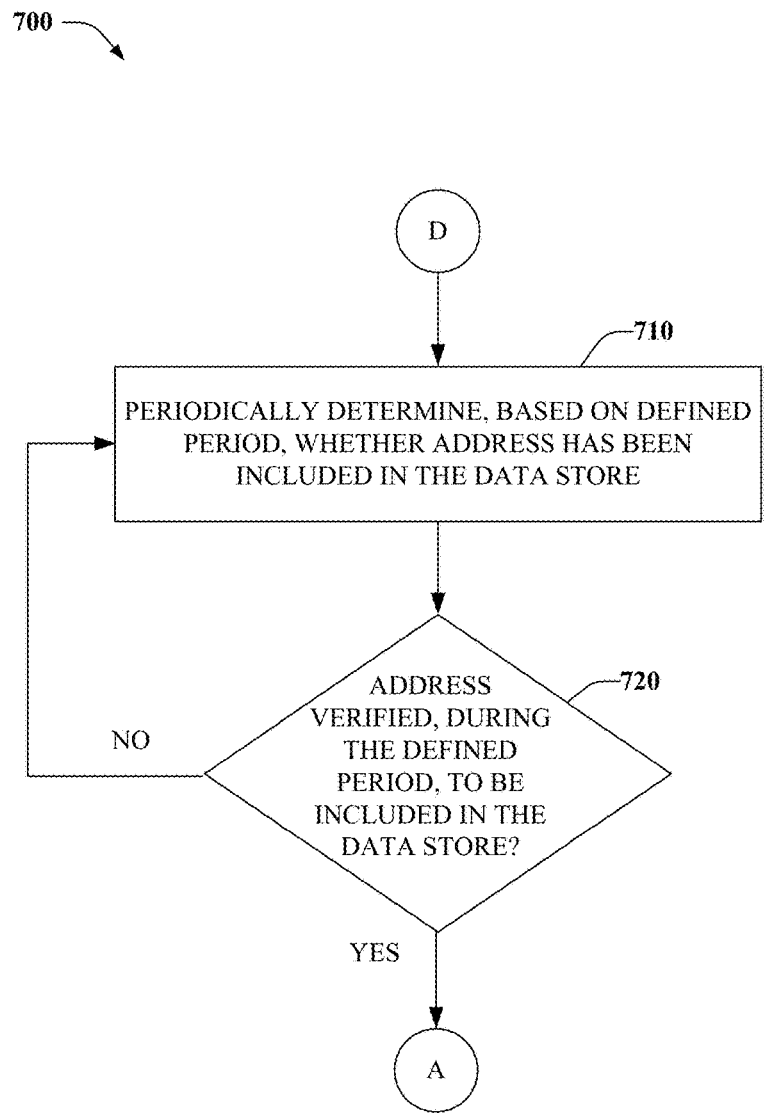

Now referring to FIGS. 1 and 2, a block diagram of emergency telecommunication service network environment 100, and a block diagram of enhanced WHP component 110 are illustrated, respectively, in accordance with various embodiments. Such embodiments disclosed herein can facilitate improved emergency response to emergency communications, e.g., response to a 9-1-1 call, etc. by sending a validated service address 105 of WHP 107 directed to PSAP 120 in response to receiving the 9-1-1 call from the WHP device.

In an aspect, WHP 107 can be coupled to wireless network 130 via wireless link 115. Wireless link 115 can be an over-the-air wireless link 115 comprising a downlink (DL) and an uplink (UL) (both not shown) that can utilize a predetermined band of radio frequency (RF) spectrum associated with, e.g., GSM, 3GPP UMTS, etc. Accordingly, WHP 107 can be a GSM and/or 3GPP UMTS based device, etc.

Further, wireless network 130 can include software and/or hardware configured to provide connectivity to/from WHP 107 and enhanced WHP component 110. In this regard, emergency telecommunication service network environment 100 can include one or more: macro, Femto, or pico access points (APs) (not shown); base stations (BS) (not shown); landline networks (e.g., optical landline networks, electrical landline networks) (not shown) communicatively coupled to enhanced WHP component 110 and components of WHP 107, e.g., wireless handset, base unit, etc. In various embodiments, WHP 107 can communicate via any number of various types of wireless technologies including, but not limited to, cellular, WiFi, WiMax, wireless local area networks (WLAN), Femto, etc. In corresponding embodiments, wireless network 130 can provide cellular, WiFi, WiMAX, WLAN, and/or other technologies for facilitating such communication. Further, wireless network 130 can include one or more of the Internet (or another communication network (e.g., IP-based network)), or a digital subscriber line (DSL)-type or broadband network facilitated by Ethernet or other technology, e.g., for communicating with one or more components of enhanced WHP component 110 and WHP 107, e.g., the wireless handset, based unit, etc.

In various embodiments, emergency telecommunication service network environment 100 can include hardware and/or software for allocating resources to WHP 107, e.g., converting or enforcing protocols, establishing and/or providing levels of Quality of Service (QoS), providing applications or services via wireless network 130, translating signals, and/or performing other desired functions to facilitate system interoperability and communication to or from WHP 107.

Wireless network 130 can include data store component(s), a memory configured to store information, and/or computer-readable storage media storing computer-executable instructions enabling various operations performed via enhanced WHP component 110 and described herein. In this regard, although address data store 102 is illustrated as being separate from wireless network 130, wireless network 130 can include one or more portions of address data store 102, which can be associated with, included within, etc. an SRDB (not shown), an MSAG (not shown), an ALI data store (not shown), etc. Further, although illustrated as being separate from wireless network 130, one or more aspects, components, etc. of enhanced WHP component 110 and PSAP component 120 can be included in wireless network 130.

Referring now to FIGS. 1 and 2, enhanced WHP component 110 can include an address component 212, location component 214, and notification component 216. Address component 212 can determine whether information representing an address, registered service address, etc., of a principal place of use, e.g., location 105, etc. corresponding to a subscriber of a wireless service, e.g., a WHP service, has been included in address data store 102, e.g., an MSAG associated with an emergency telecommunication service, e.g., E911 service, text-to-911 service, e.g., where supported by specific and enabled PSAPs, etc.

In an embodiment, address component 212 can determine whether the information has been included in address data store 102 at a first validation point associated with a POS of WHP 107. Further, address component 212 can determine whether the information has been included in address data store 102 at a second validation point associated with activation of the wireless service of WHP 107, e.g., at location 105. Furthermore, address component 212 can utilize other validation points to determine whether the information has been included in address data store 102.

In one or more embodiments, address component 212 can determine whether the information has been included in address data store 102 by sending an address request directed to a service provider device, e.g., service provider system 204. In this regard, service provider system 204 can be associated with an SRDB, an MSAG, an ALI data store, e.g., maintained by an ILEC, etc. Further, address component 212 can receive, from service provider system 204, the information representing the address, registered service address, etc. In another embodiment, address component 212 can receive other information from service provider system 204, e.g., confirming whether the information has been included in address data store 102.

If address component 212 has determined that the information representing the address has not been included in address data store 102, e.g., after the first validation point, the second validation point, multiple validation points, etc., and enhanced WHP component 110 determines that a communication, e.g., 9-1-1 call, corresponding to the emergency telecommunication service, e.g., E911, has been received, made, etc. via WHP 107, then enhanced WHP component 110 can send location information, e.g., Mobility E911 Phase I location information representing a location of a base station receiving the E911 call from WHP 107, Mobility E911 Phase II location information representing a latitude and longitude of WHP 107, etc. directed to a PSAP during the emergency telecommunication service. Further, enhanced WHP component 110 can send a name of the subscriber and/or a call back number of the subscriber directed to the PSAP during the emergency telecommunication service.

On the other hand, if address component 212 has determined that the information representing the address has been included in address data store 102, then location component 214 can determine whether a distance, radial distance, etc. from WHP 107 to a geolocation, e.g., latitude and longitude coordinates, etc. corresponding to the address of location 105 is no more than 150 meters, e.g., within radial distance 140 of location 105. In one or more embodiments, location component 214 can determine whether the radial distance from WHP 107 to the geolocation corresponding to the address of location 105 is less than or equal to radial distance 140 of location 105 by sending a location request directed to a service provider device, e.g., location system 206, etc. to obtain geolocation information, e.g., GPS based coordinates, of WHP 107. In this regard, location system 206 can track a location of WHP 107 using, e.g., A-GPS, OTDOA, U-TDOA, GPS, GLONASS, AOA, TDOA, E-OTD, etc. technologies. In other embodiment(s), location system 206 can track the location of WHP 107 utilizing an RRLP, which can exchange messages between WHP 107 and an SMLC to obtain the geolocation information of WHP 107. Further, location component 214 can receive, based on the location request, the geolocation information from location system 206.

In this regard, if location component 214 has determined that the radial distance from WHP 107 to the geolocation corresponding to the address of location 105 is greater than radial distance 140, and enhanced WHP component 110 determines that the communication, e.g., 9-1-1 call, has been received via WHP 107, then enhanced WHP component 110 can send the location information, e.g., Mobility E911 Phase I information, Mobility E911 Phase II information, etc. directed to the PSAP during the emergency telecommunication service. Enhanced WHP component 110 can further send the name of the subscriber and/or the call back number of the subscriber directed to the PSAP during the emergency telecommunication service.

On the other hand, if location component 214 has determined that the radial distance from WHP 107 to the geolocation corresponding to the address of location 105 is less than or equal to radial distance 140 of location 105, and enhanced WHP component 110 determines that the communication has been received via WHP 107, then enhanced WHP component 110 can send the information representing the address directed to the PSAP device during the emergency telecommunication service, in addition to the name of the subscriber and the call back number of the subscriber.

In one embodiment, location component 214 can periodically determine, based on a defined period, e.g., daily, whether the radial distance from WHP 107 to the geolocation corresponding to the address of location 105 is greater than radial distance 140.

In another embodiment, if location component 214 has determined that the radial distance from WHP 107 to the geolocation corresponding to the address of location 105 is greater than radial distance 140, location component 214 can determine whether the radial distance from WHP 107 to the geolocation is no more than 2 kilometers. If location component 214 has determined that the radial distance from WHP 107 to the geolocation is no more than 2 kilometers, but greater than 150 meters, location component 214 can determine, based on a defined schedule, e.g., performing 3 location requests per day, e.g., a.m., noon, and p.m., etc. for 3 consecutive days, etc. whether the radial distance from WHP 107 to the geolocation is no more than 150 meters. In this regard, location component 214 can account for location measurement errors, e.g., due to mountainous terrain, tall buildings, adverse weather conditions, etc.

If location component 214 has determined, at the completion of the defined schedule, that the radial distance from WHP 107 to the geolocation is greater than 150 meters, notification component 216 can send, during a "call to action"/"customer notification process", a message, notification, subscriber notification, phone message, email message, text message, letter mailed to a billing address of the subscriber, etc. directed to the subscriber at a defined frequency, e.g., once per week, for a defined period of time, e.g., 4 consecutive weeks, etc. In one or more embodiments, the message can include a recorded message sent to a phone number of WHP 107, a text message sent to a phone number specified by the subscriber, e.g., during the POS of WHP 107, an email sent to an email account specified by the subscriber, e.g., during the POS of WHP 107, a notice sent to an account of the subscriber corresponding to a cloud-based website of a wireless service provider corresponding to the WHP service, etc.

In an embodiment, in response to a determination, e.g., by notification component 216, e.g., via address component 212, e.g., after a predetermined period of time, e.g., after 4 weeks, after a defined number of notifications, etc. that the information representing the address, registered address, etc. has not been included in address data store 102, notification component 216 can send a message, e.g., final notice, etc. directed to the subscriber, e.g., stating an inability to support service address submittal during E911 services, while E911 latitude and longitude location information, subscriber name, and customer call back information will be provided during the E911 services.

In one embodiment, in response to the determination by notification component 216, e.g., via location component 214, e.g., after the predetermined period of time, after the defined number of notifications, etc. that the radial distance from WHP 107 to the geolocation is greater than 150 meters, notification component 216 can send the message, e.g., stating the inability to support service address submittal during E911 services, while E911 latitude and longitude location information, subscriber name, and customer call back information will be provided during the E911 services.

FIGS. 3-12 illustrate methodologies in accordance with the disclosed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIGS. 3-12, processes 300-1200 performed by system(s), and/or component(s) described herein, e.g., enhanced WHP component 110, are illustrated, in accordance with various embodiments. At 310, it can be determined, e.g., at a POS of WHP 107, whether an address, registered service address, principle place of use, etc. of WHP 107 has been included in a data store, e.g., MSAG, corresponding to an emergency telecommunication service, e.g., E911 service. If it is determined that the address has been included in the data store, flow continues to 410, at which it can be determined whether a location of WHP 107 satisfies a first defined condition with respect to a distance of WHP 107 from the address, e.g., whether WHP 107 is no more than 150 meters from the address; otherwise, flow continues to 320, at which mobility latitude and longitude E911 service, e.g., Mobility E911 Phase I and/or Mobility E911 Phase II support, can be provided to WHP 107 during the E911 service, e.g., initiated from WHP 107.

Flow continues from 320 to 330, at which it can be determined, e.g., at an installation of service of WHP 107, whether the address has been included in the data store. If it is determined that the address has been included in the data store, flow continues to 410, otherwise flow continues to 610, at which a "call to action" process can be initiated, in which a message, notification, phone message, email message, text message, letter mailed to a billing address of the subscriber, etc. can be directed to the subscriber at a defined frequency, e.g., once per week, for a defined period of time, e.g., 4 consecutive weeks, etc., e.g., stating an inability to support submittal of an address during an E911 service. In one or more embodiments, the message can include a recorded message sent to a phone number of WHP 107, a text message sent to a cell number specified by the subscriber, e.g., at the POS of WHP 107, an email sent to an email account specified by the subscriber, e.g., at the POS of WHP 107, a notice sent to an account of the subscriber corresponding to a cloud-based website of a wireless service provider corresponding to the wireless service, e.g., a WHP service, etc.

Returning now to 410, if it is determined that the location of WHP 107 satisfies the first defined condition with respect to the distance of WHP 107 from the address, flow continues to 420, at which the address can be provided to a PSAP during an E911 service initiated via WHP 107; otherwise, flow continues to 510, at which it can be determined whether the location of WHP 107 satisfies a second defined condition with respect to the distance of WHP 107 from the address, e.g., whether WHP 107 is more than 150 meters from the address, but no more than 2 kilometers from the address.

If it is determined at 510 that the location of WHP 107 satisfies the second defined condition, flow continues to 520, at which it can be periodically determined, based on a defined schedule, e.g., a "3×3 pinging" schedule, whether the location of WHP 107 satisfies the first defined condition, e.g., to account for location measurement errors, e.g., due to mountainous terrain, tall buildings, adverse weather conditions, etc.; otherwise, flow continues to 610 (see above). In this regard, a defined number of location queries per day, e.g., 3 (morning, noon, evening), etc. for a defined number of consecutive days, e.g., 3, etc. can be performed to determine whether the location of WHP 107 satisfies the first defined condition.

At 530, if it is determined, during the defined schedule, that the location of WHP 107 satisfies the first defined condition, flow continues to 540, at which the address can be provided to the PSAP during the E911 service, with flow continuing to 410 (see above); otherwise, flow continues to 610 (see above). Returning now to 610, if it is determined, during the defined period of time corresponding to the call to action process of 610, whether the address has been included in the data store, flow continues to 410 (see above); otherwise, flow continues to 630, at which a notice, final notice, etc. directed to the subscriber can be sent, e.g., stating that there is an inability to support address submittal during an E911 service, but mobility latitude and longitude E911 service, e.g., Mobility E911 Phase I and/or Mobility E911 Phase II support, can be provided to WHP 107 during the E911 service, e.g., initiated from WHP 107.

Flow continues from 630 to 710, at which it can periodically be determined, based on a defined period, e.g., once per year, whether the address has been included in the data store. If it is determined, after the defined period, that the address has been included in the data store, flow continues to 410 (see above); otherwise flow returns to 710.

Figure 8:
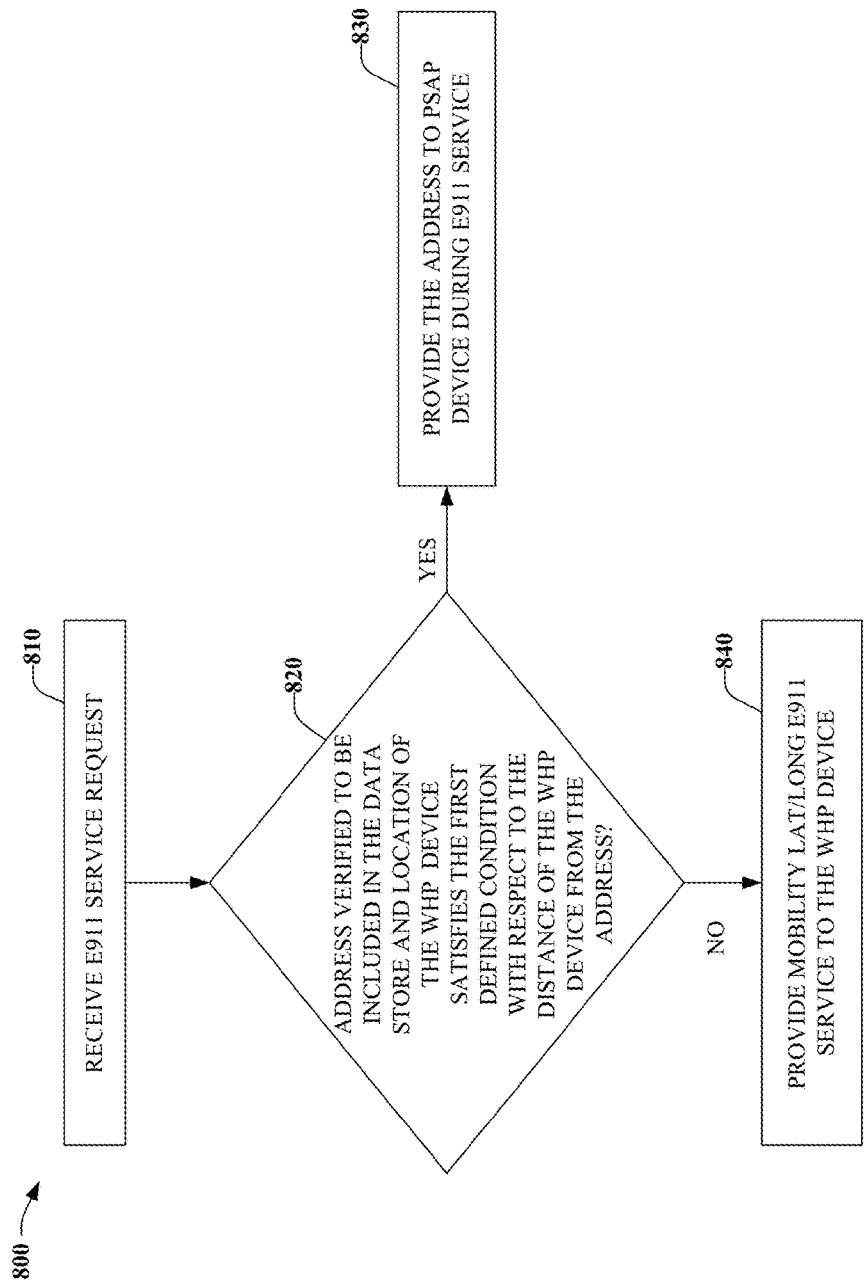
FIGS. 8-12 illustrate flow diagrams of other methods associated with the enhanced wireless home phone component, in accordance with various embodiments.
Figure 9:
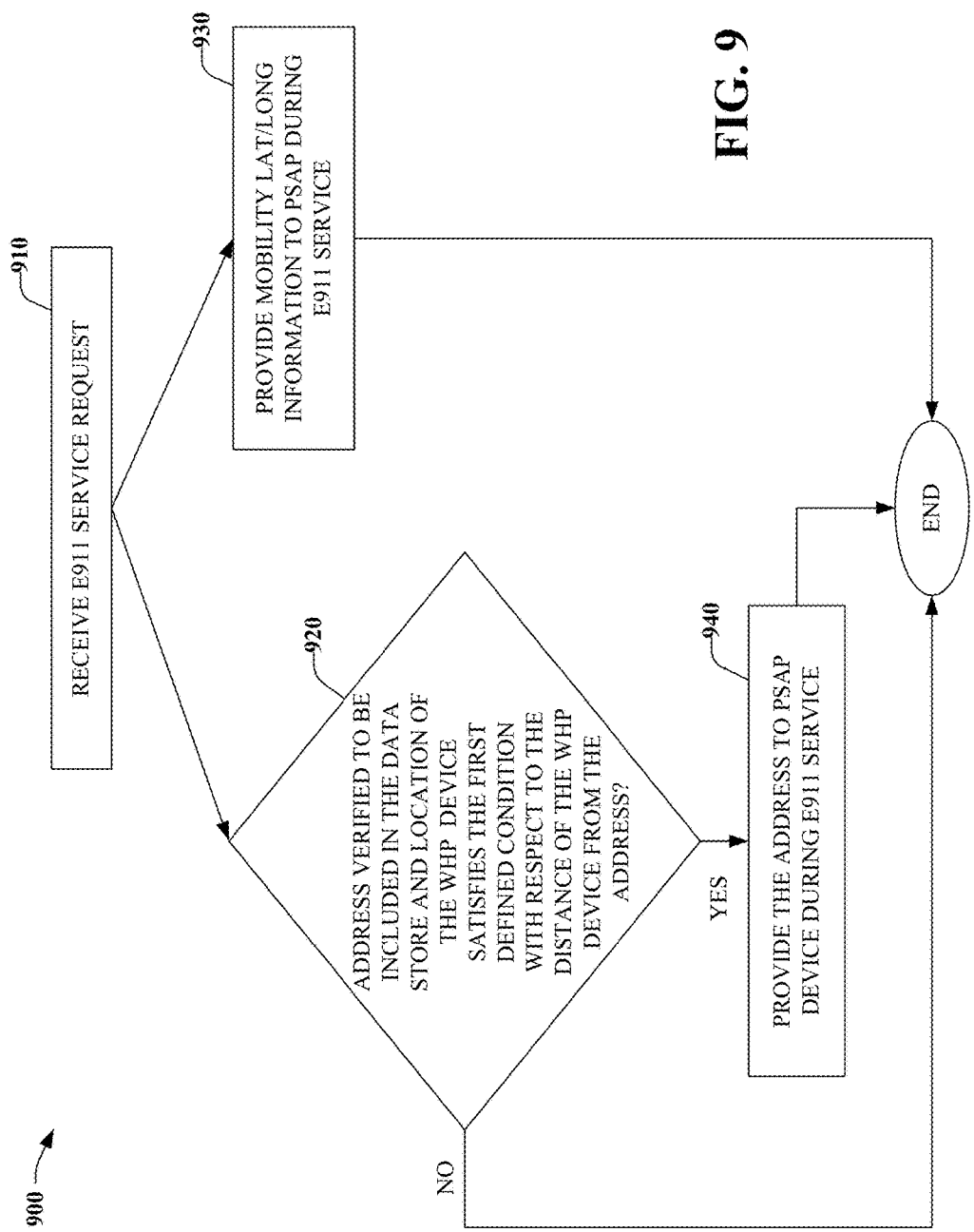

Referring now to FIGS. 8 and 9, at 810, an E911 service request, e.g., corresponding to the E911 service initiated via WHP 107, can be received, detected, etc. At 820, in response to determining that the address has been included in the data store, and that the location of WHP 107 satisfies the first defined condition with respect to the distance of WHP 107 from the address, flow continues to 830, at which the address can be provided to the PSAP during the E911 service initiated via WHP 107; otherwise, flow continues to 840, at which the mobility latitude and longitude E911 service, e.g., Mobility E911 Phase I and/or Mobility E911 Phase II support, can be provided to WHP 107 during the E911 service.

In an embodiment illustrated by FIG. 9, at 910, the E911 service request can be received, detected, etc. Flow continues to 920 and 930, at which the mobility latitude and longitude service, information, etc. can be provided, at 930, to the PSAP, and it can be determined, at 920, whether the address has been included in the data store, and whether the location of WHP 107 satisfies the first defined condition. In response to determining that the address has been included in the data store, and that the location of WHP 107 satisfies the first defined condition, flow continues to 940, at which the address can be provided to the PSAP during the E911 service.

Figure 10:
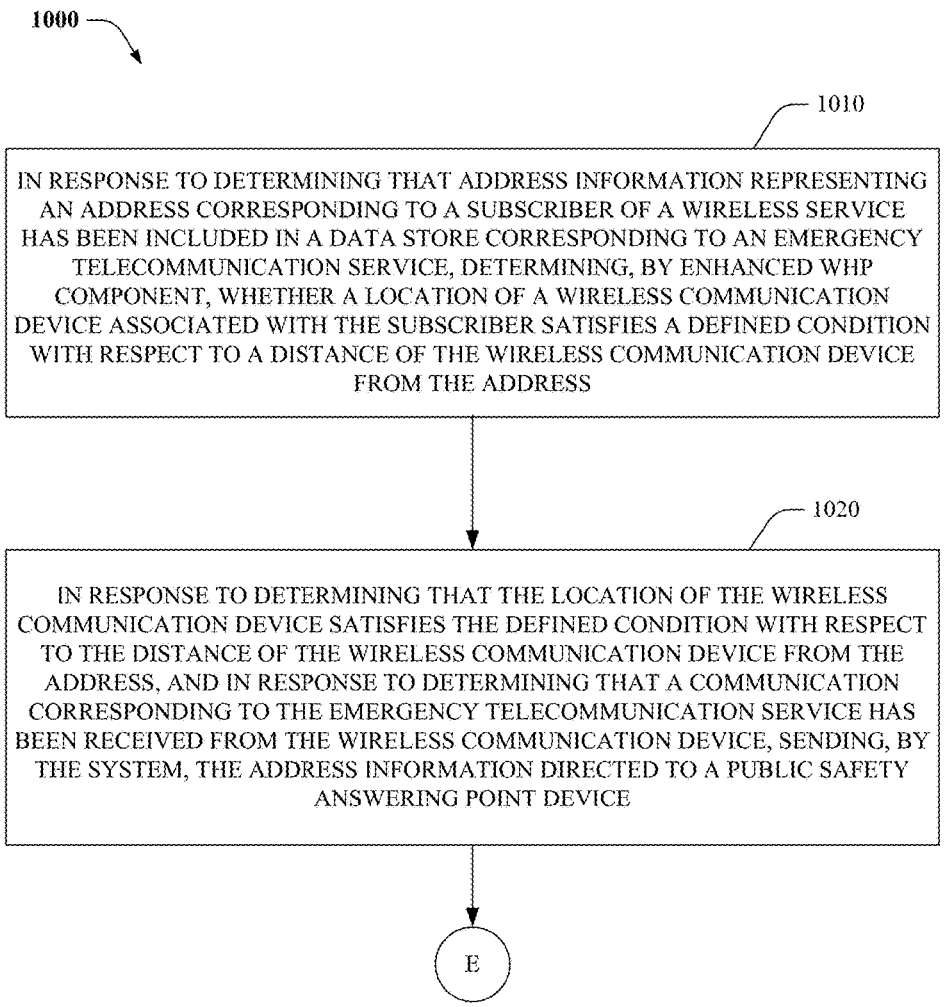
Figure 11:
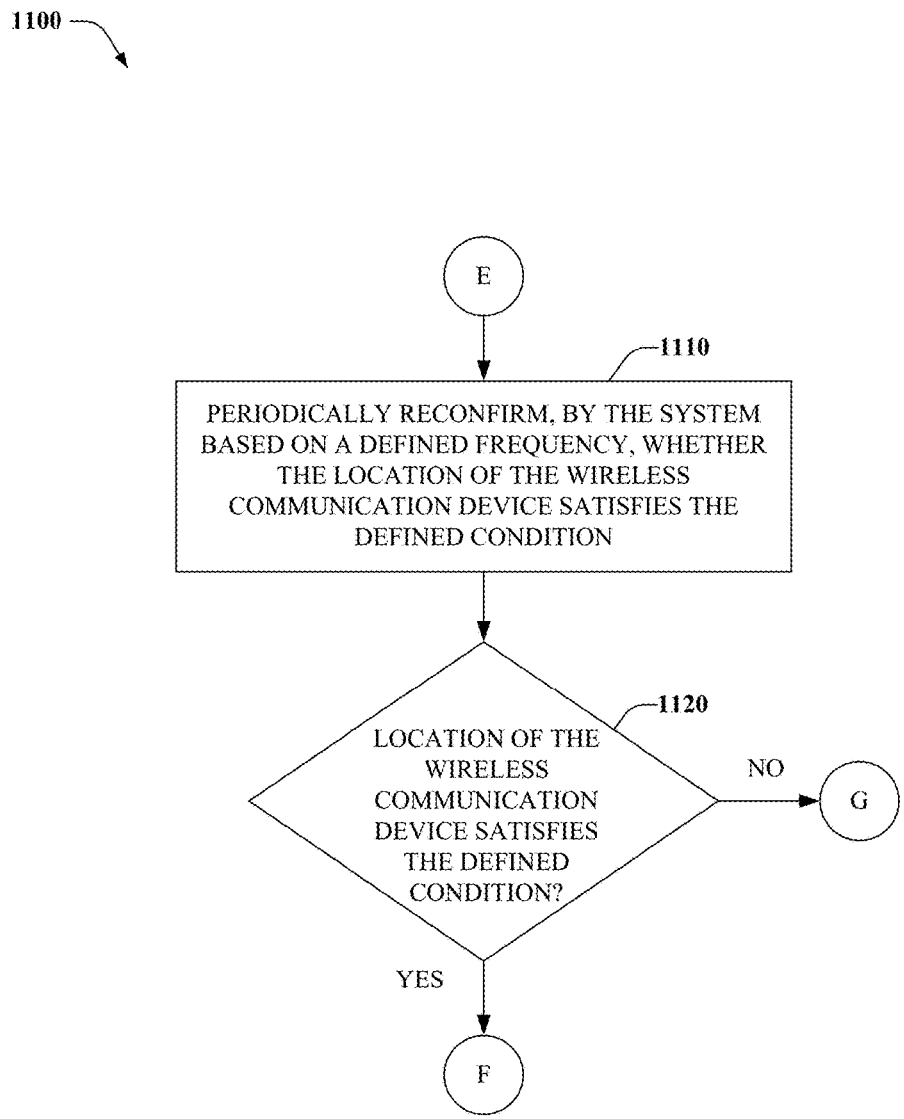
Figure 12:
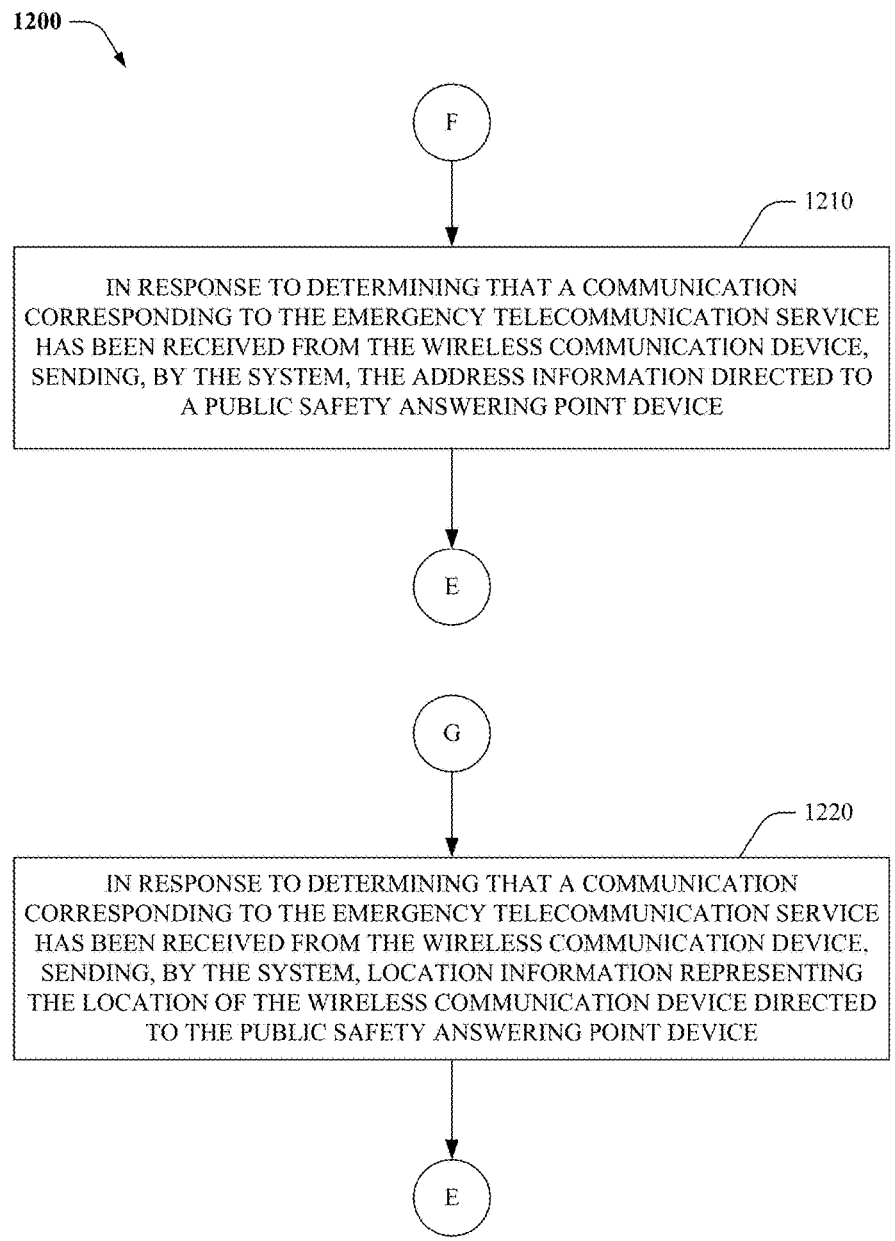

Now referring to FIGS. 10-12, at 1010, in response to determining that address information representing an address corresponding to a subscriber of a wireless service has been included in a data store corresponding to an emergency telecommunication service, process 1000 can determine, via enhanced WHP component 110, whether a location of a wireless communication device associated with the subscriber satisfies a defined condition with respect to a distance of the wireless communication device from the address.

At 1020, in response to determining that the location of the wireless communication device satisfies the defined condition with respect to the distance of the wireless communication device from the address, and in response to determining that a communication corresponding to the emergency telecommunication service has been received from the wireless communication device, sending, by the system, the address information directed to a public safety answering point device.

Flow continues from 1020 to 1110, at which enhanced WHP component 110 can periodically reconfirm, via enhanced WHP component 110 based on a defined frequency, e.g., daily, whether the location of the wireless communication device satisfies the defined condition with respect to the distance of the wireless communication device from the address.

At 1120, in response to determining, based on the defined frequency, that the location of the wireless communication device satisfies the defined condition, flow continues to 1210, at which in response to determining that a communication corresponding to the emergency telecommunication service has been received from the wireless communication device, enhanced WHP component 110 can send the address information directed to a public safety answering point device, with flow continuing to 1110 (see above).

In response to determining, at 1120, that the location of the wireless communication device does not satisfy the defined condition, flow continues to 1220, at which in response to determining that the communication corresponding to the emergency telecommunication service has been received from the wireless communication device, enhanced WHP component 110 can send location information representing the location of the wireless communication device, e.g., Mobility E911 Phase I and/or Mobility E911 Phase II based information, directed to the public safety answering point device, with flow continuing to 1110 (see above).

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in non-volatile memory 1322 (see below), disk storage 1324 (see below), and/or memory storage 1346 (see below). Further, nonvolatile memory can be included in read only memory (ROM), programmable ROM (PROM), electrically programmable ROM (EPROM), electrically erasable ROM (EEPROM), or flash memory. Volatile memory 1320 can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 13:
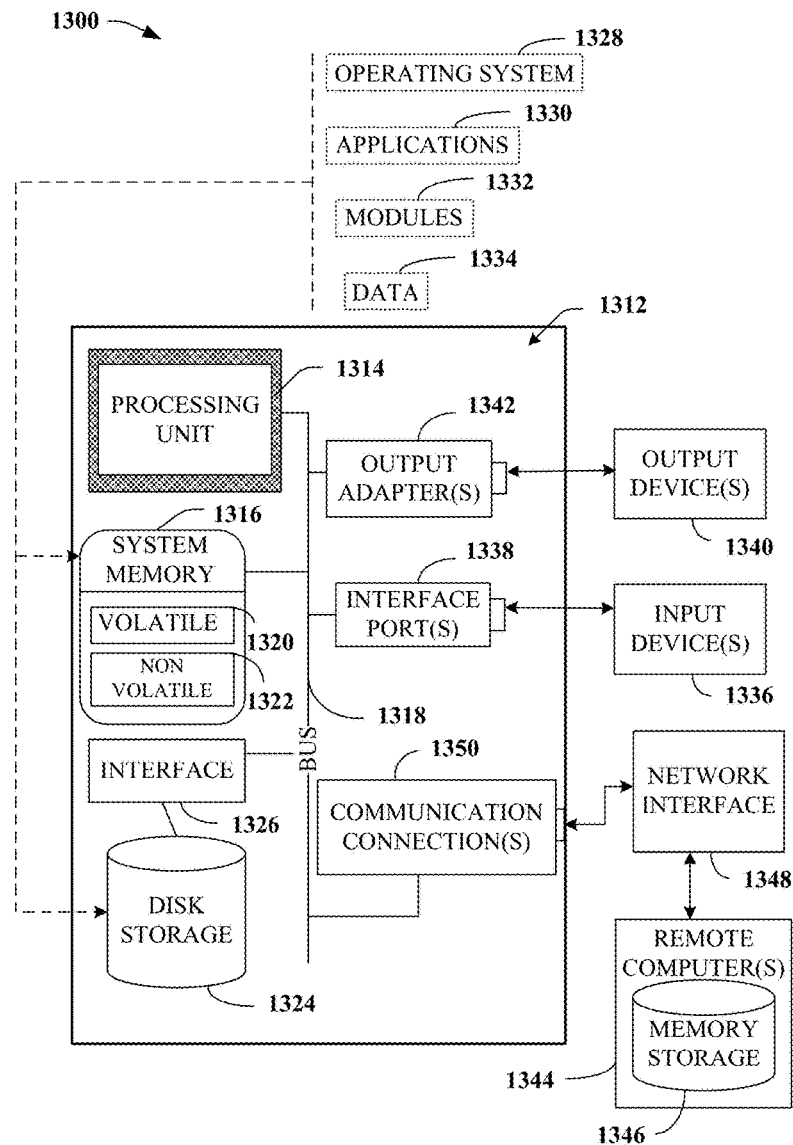
FIG. 13 illustrates a block diagram representing an illustrative non-limiting computing system or operating environment in which one or more aspects of various embodiments described herein can be implemented.

In order to provide a context for the various aspects of the disclosed subject matter, FIG. 13, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the subject innovation also can be implemented in combination with other program modules. Generally, program modules include routines, programs, components, data structures, etc. that perform particular tasks and/or implement particular abstract data types.

Moreover, those skilled in the art will appreciate that the inventive systems can be practiced with other computer system configurations, including single-processor or multi-processor computer systems, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 13, a block diagram of a computing system 1300 operable to execute the disclosed components, systems, etc., e.g., enhanced WHP component 110, etc. is illustrated, in accordance with an embodiment. Computer 1312 includes a processing unit 1314, a system memory 1316, and a system bus 1318. System bus 1318 couples system components including, but not limited to, system memory 1316 to processing unit 1314. Processing unit 1314 can be any of various available processors. Dual microprocessors and other multiprocessor architectures also can be employed as processing unit 1314.

System bus 1318 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), Small Computer Systems Interface (SCSI), and/or controller area network (CAN) bus used in vehicles.

System memory 1316 includes volatile memory 1320 and nonvolatile memory 1322. A basic input/output system (BIOS), containing routines to transfer information between elements within computer 1312, such as during start-up, can be stored in nonvolatile memory 1322. By way of illustration, and not limitation, nonvolatile memory 1322 can include ROM, PROM, EPROM, EEPROM, or flash memory. Volatile memory 1320 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1312 also includes removable/non-removable, volatile/non-volatile computer storage media. FIG. 13 illustrates, for example, disk storage 1324. Disk storage 1324 includes, but is not limited to, devices like a magnetic disk drive, floppy disk drive, tape drive, Jaz drive, Zip drive, LS-100 drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to system bus 1318, a removable or non-removable interface is typically used, such as interface 1326.

It is to be appreciated that FIG. 13 describes software that acts as an intermediary between users and computer resources described in suitable operating environment 1300. Such software includes an operating system 1328. Operating system 1328, which can be stored on disk storage 1324, acts to control and allocate resources of computer system 1312. System applications 1330 take advantage of the management of resources by operating system 1328 through program modules 1332 and program data 1334 stored either in system memory 1316 or on disk storage 1324. It is to be appreciated that the disclosed subject matter can be implemented with various operating systems or combinations of operating systems.

A user can enter commands or information into computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1314 through system bus 1318 via interface port(s) 1338. Interface port(s) 1338 include, for example, a serial port, a parallel port, a game port, a universal serial bus (USB), a wireless based port, e.g., WiFi, Bluetooth®, etc. Output device(s) 1340 use some of the same type of ports as input device(s) 1336.

Thus, for example, a USB port can be used to provide input to computer 1312 and to output information from computer 1312 to an output device 1340. Output adapter 1342 is provided to illustrate that there are some output devices 1340, like display devices, light projection devices, monitors, speakers, and printers, among other output devices 1340, which use special adapters. Output adapters 1342 include, by way of illustration and not limitation, video and sound devices, cards, etc. that provide means of connection between output device 1340 and system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. Remote computer(s) 1344 can be a personal computer, a server, a router, a network PC, a workstation, a microprocessor based appliance, a peer device, or other common network node and the like, and typically includes many or all of the elements described relative to computer 1312.

For purposes of brevity, only a memory storage device 1346 is illustrated with remote computer(s) 1344. Remote computer(s) 1344 is logically connected to computer 1312 through a network interface 1348 and then physically and/or wirelessly connected via communication connection 1350. Network interface 1348 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refer(s) to hardware/software employed to connect network interface 1348 to bus 1318. While communication connection 1350 is shown for illustrative clarity inside computer 1312, it can also be external to computer 1312. The hardware/software for connection to network interface 1348 can include, for example, internal and external technologies such as modems, including regular telephone grade modems, cable modems and DSL modems, wireless modems, ISDN adapters, and Ethernet cards.

The computer 1312 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1312 can connect to other devices/networks by way of antenna, port, network interface adaptor, wireless access point, modem, and/or the like.

The computer 1312 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This includes at least WiFi and Bluetooth® wireless technologies. Thus, the communication can be a predefined structure as with a conventional network or simply an ad hoc communication between at least two devices.

WiFi allows connection to the Internet from a desired location (e.g., a vehicle, couch at home, a bed in a hotel room, or a conference room at work, etc.) without wires. WiFi is a wireless technology similar to that used in a cell phone that enables such devices, e.g., mobile phones, computers, etc., to send and receive data indoors and out, anywhere within the range of a base station. WiFi networks use radio technologies called IEEE 802.11 (a, b, g, etc.) to provide secure, reliable, fast wireless connectivity. A WiFi network can be used to connect communication devices (e.g., mobile phones, computers, etc.) to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
in response to determining, by a system comprising a processor during a validation associated with a point of sale of a user equipment corresponding to a subscriber identity associated with a wireless service, that address information representing an address corresponding to the subscriber identity has not been included in a data store corresponding to an emergency telecommunication service, monitoring, by the system based on a defined monitoring period, whether the address information has been included in the data store; and
in response to the address information being determined not to have been included in the data store, configuring, by the system based on a configuration, a component of the system to send, during the emergency telecommunication service, geographical information representing a location of the user equipment to a public safety answering point device, wherein the geographical information comprises latitude information representative of a latitude and longitude information representative of a longitude.

2. The method of claim 1, further comprising:
based on the configuration, and in response to a communication corresponding to the emergency telecommunication service being determined to have been received from the user equipment, sending, by the system, the geographical information directed to the public safety answering point device.

3. The method of claim 1, wherein the validation is a first validation, and wherein the method further comprises:
in response to the configuring, determining, by the system during a second validation associated with an activation of the user equipment, whether the address information has been included in the data store.

4. The method of claim 3, further comprising:
in response to determining, during the second validation, that the address information has not been included in the data store, sending, by the system, a message directed to the subscriber identity, wherein the message indicates an inability to provide the address information during the emergency telecommunication service.

5. The method of claim 3, further comprising:
in response to determining, during the second validation, that the address information has been included in the data store, determining, by the system, whether a location of the user equipment satisfies a defined condition with respect to a distance of the user equipment from the address.

6. The method of claim 5, wherein the configuring based on the configuration is a first configuring based on a first configuration, and wherein the method further comprises:
in response to determining that the location of the user equipment satisfies the defined condition with respect to the distance of the user equipment from the address, second configuring, by the system based on a second configuration, the component of the system to send, during the emergency telecommunication service, the address information to the public safety answering point device.

7. The method of claim 6, further comprising:
based on the second configuration, and in response to a communication corresponding to the emergency telecommunication service being determined to have been received from the user equipment, sending, by the system, the address information directed to the public safety answering point device.

8. The method of claim 1, further comprising:
in response to the address information being determined to have been included in the data store, determining, by the system, whether a location of the user equipment satisfies a defined condition with respect to a distance of the user equipment from the address.

9. The method of claim 8, wherein the configuring based on the configuration is a first configuring based on a first configuration, and wherein the method further comprises:
in response to determining that the location of the user equipment satisfies the defined condition with respect to the distance of the user equipment from the address, second configuring, by the system based on a second configuration, the component of the system to send, during the emergency telecommunication service, the address information to the public safety answering point device.

10. The method of claim 9, further comprising:
based on the second configuration, in response to a communication corresponding to the emergency telecommunication service being determined to have been received from the user equipment, sending, by the system, the address information directed to the public safety answering point device.

11. A system, comprising:
a processor; and
a memory that stores executable instructions that, when executed by the processor, facilitate performance of operations, comprising:
in response to determining, during a first validation corresponding to a transaction at a point of sale of a mobile device associated with a subscriber identity representative of a subscriber that has subscribed to a wireless service, that an address corresponding to the subscriber identity has not been included in a data store associated with an emergency telecommunication service, repeating determining, during respective validations based on a defined frequency, whether the address has been included in the data store; and
in response to the address being determined not to have been included in the data store, determining a geolocation associated with the mobile device, wherein the geolocation comprises a latitude and a longitude associated with the mobile device.

12. The system of claim 11, wherein the operations further comprise:
in response to the determining of the geolocation, and in response to a communication corresponding to the emergency telecommunication service being determined to have been received from the mobile device, sending the geolocation information directed to a public safety answering point device.

13. The system of claim 11, further comprising:
in response to the determining of the geolocation, determining, during a second validation corresponding to an installation of the wireless service on the mobile device, whether the address has been included in the data store.

14. The system of claim 11, wherein the operations further comprise:
in response to the address being determined to have been included in the data store, determining whether a distance from the mobile device to a location represented by the address satisfies a defined condition.

15. The system of claim 14, wherein the operations further comprise:
in response to determining that the distance from mobile device to the location represented by the address satisfies the defined condition, and in response to a communication corresponding to the emergency telecommunication service being determined to have been received from the mobile device, sending the address directed to a public safety answering point device.

16. The system of claim 11, wherein the determining that the address has not been included in the data store comprises:
sending an address request directed to a device associated with a service provider of the wireless service; and
in response to the sending of the address request, receiving, from the device, confirmation information representing an indication that the address has not been included in the data store.

17. The system of claim 16, wherein the device is configured to enable access to a street address guide comprising the address.

18. A non-transitory machine-readable storage medium, comprising executable instructions that, when executed by a processor, facilitate performance of operations, comprising:
in response to determining, during a validation associated with a point of sale of a wireless communication device, that an address corresponding to a subscriber identity associated with a wireless service has not been included in a data store corresponding to an emergency telecommunication service, determining, during respective validations configured to occur according to a defined schedule, whether the address has been included in the data store; and
in response to the address being determined not to have been included in the data store, determining location information comprising a longitude and a latitude representing a location of the wireless communication device.

19. The non-transitory machine-readable storage medium of claim 18, wherein the operations further comprise:
in response to the address being determined to have been included in the data store, determining whether a distance of the wireless communication device from a first geolocation of the wireless communication device to a second geolocation of the address satisfies a defined condition.

20. The non-transitory machine-readable storage medium of claim 19, wherein the operations further comprise:
in response to determining that the distance of the wireless communication device from the first geolocation to the second geolocation satisfies the defined condition, and in response to a communication corresponding to the emergency telecommunication service being determined to have been received from the wireless communication device, facilitating sending of information representing the address directed to a public safety answering point device.

* * * * *